United States Patent [19]
Williams et al.

[11] 3,845,295
[45] Oct. 29, 1974

[54] CHARGE-COUPLED RADIATION SENSING CIRCUIT WITH CHARGE SKIM-OFF AND RESET

[75] Inventors: Brown F. Williams, Princeton; Walter Frank Kosonocky, Skillman, both of N.J.

[73] Assignees: RCA Corporation, New York, N.Y.

[22] Filed: May 2, 1973

[21] Appl. No.: 356,367

[52] U.S. Cl............. 250/211 J, 250/208, 307/221, 357/24
[51] Int. Cl............................................. H01j 11/00
[58] Field of Search............ 178/7.3 DC; 307/221 D, 307/221 C, 221; 250/208, 209, 211 J; 357/24

[56] References Cited
UNITED STATES PATENTS

| | | | |
|---|---|---|---|
| 3,207,998 | 9/1965 | Corney et al.................. | 178/7.3 DC |
| 3,268,658 | 8/1966 | Schroeder et al............ | 178/7.3 DC |
| 3,656,011 | 4/1972 | Weinberg....................... | 307/221 C |
| 3,683,193 | 8/1972 | Weimer........................ | 307/311 X |
| 3,716,724 | 2/1973 | Parrish.......................... | 307/221 C |
| 3,771,149 | 11/1973 | Collins et al.................. | 307/221 C |

*Primary Examiner*—Harold A. Dixon
*Attorney, Agent, or Firm*—H. Christoffersen; S. Cohen

[57] ABSTRACT

The radiation induced charge signals accumulated at the radiation sensors of a radiation sensing array are processed to improve the contrast of the sensed image. Of the total charge signal present at each sensor, only that portion greater than a given charge signal level is shifted into the stage at that location of a charge-coupled register. The remainder—the major portion of the charge signal, is conducted to a current sink, the radiation sensors being reset to a given reference voltage level in the process.

8 Claims, 6 Drawing Figures

(a) ELECTRODE STRUCTURE (b) POTENTIAL PROFILE NEAR END OF INTEGRATION TIME (c) $V_T$ CHANGES FROM -1v TO -4v CAUSING SMALL PART OF CHARGE TO TRANSFER TO C.C. STAGE (d) $V_R$ CHANGES FROM -3v TO -25v $V_T$ RETURNS TO -1v

CHARGE-COUPLED RADIATION SENSING CIRCUIT WITH CHARGE SKIM-OFF AND RESET

A problem which exists in the viewing of scenes in certain regions of the radiation spectrum, such as in the infrared, is that although the scene brightness is high, the contrast is very low-of the order of 0.1 —0.5 percent for a temperature difference ΔT of 0.1°. What this means in terms of an image sensing array is that the amount of signal of interest is only a very small part of the total radiation reaching the array. When two such charge signals are compared or reproduced, the contrast between them is quite small.

It is known in the art to process signals of the type discussed above to improve contrast-ratio. One standard procedure is frame-to-frame cancellation. In this procedure, a first frame which includes both intelligence and background is subtracted from a following frame which includes only background to cancel, as much as possible, the background.

In a system embodying the present invention, the charge signal produced at an image sensor is processed in another way. Of the total charge signal accumulated at a sensor, only that portion greater than a given charge signal level is shifted into a register stage. The remaining portion of the charge signal, which is the major part thereof, is then conducted to a current sink, the radiation sensor being reset to a given reference voltage level in the process.

The invention is illustrated in the following drawings of which:

Figure 1:
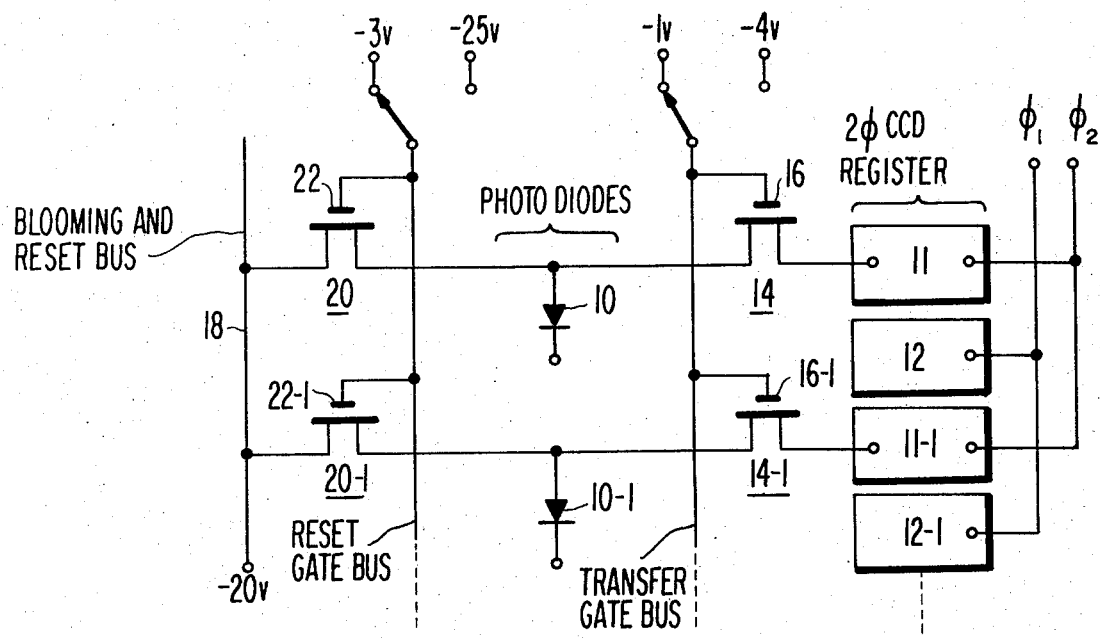
FIG. 1 is a schematic showing of an embodiment of the invention.

The array shown schematically in FIG. 1 may include hundreds or even thousands of locations. While to simplify the showing only two such locations are shown, the operating principles of the array remain the same.

Each location includes a radiation sensing element, shown as a photodiode 10, and a charge-coupled register stage. For purposes of the present explanation, the charge-coupled register is illustrated as a two-phase register and the stage associated with photodiode 10 includes two electrodes 11, and 12, driven by the two phases $\phi_2$ and $\phi_1$ respectively. The coupling between the radiation-sensor 10 and the charge-coupled register stage is shown schematically in FIG. 1 as the conduction path of field-effect transistor structure 14. The conductivity of the path is controlled by gate electrode 16. In the explanation which comes later, this conduction path is considered in terms of potential hills and valleys, as will become evident shortly.

The radiation sensor 10 also is coupled to a current sink 18, legended "blooming and reset bus." This bus has another purpose, not of concern in the present application, namely that of controlling "blooming," as discussed in copending application Ser. No. 293,829, titled "Dynamic Control of 'Blooming' in Charge Coupled, Image-Sensing Arrays" by the present inventors and assigned to the same assignee as the present application. The coupling from the sensor to the blooming bus is via the conduction channel of field-effect transistor structure 20. The impedance of this channel is controlled by gate electrode 22.

In the operation of the circuit of FIG. 1, during a given integration time, which may be of the order of 30 milliseconds or more, depending upon the image intensity, the voltages applied to the various elements are as shown. The $\phi_1$ and $\phi_2$ voltages may be held steady at −5 volts (see FIG. 5). The gate electrode 16 may be maintained at a voltage of −1 volt and the gate electrode 22 at a voltage of −3 volts. It may be assumed that the photodiode sensors such as 10 electrically float but have been reset to a level such that they are capable of accumulating charge in response to radiation. At this level and at the gate voltages shown, the devices 14 and 14–1, and 20 and 20–1 have high impedance conduction paths and the charges accumulated at the sensors 10 and 10–1 remain localized at these sensors.

At the end of the integration time, the gate electrodes 16 and 16–1 are placed at a potential such as −4 volts. As will be shown in more detail shortly, this permits a limited amount of conduction through the conduction paths of transistors 14 and 14–1, and a small portion of the charge accumulated at sensors 10 and 10–1 passes to the charge-coupled register stages 11 and 11–1, respectively. The gate electrodes 16 and 16–1 are then returned to −1 volt, returning the conduction channels to their high impedance condition. The charge shifted to the charge-coupled register now may be shifted out of the register by the application of the two phase voltages $\phi_1$, $\phi_2$.

Any time after the transfer gate bus has been returned to −1 volt, the gate electrodes 22 and 22–1 briefly may be placed at a voltage of −25 volts to cause heavy conduction through the conduction channel of the devices 20 and 20–1. The potentials are such that all of the charge remaining in the sensors 10 and 10–1 passes through the conduction channels of the transistors 20, 20–1, respectively to the drain bus 18, with the photodiodes 10 and 10–1 becoming reset to the −20 volts level in the process. The next frame of charge signal now may again begin to accumulate.

Figure 2:
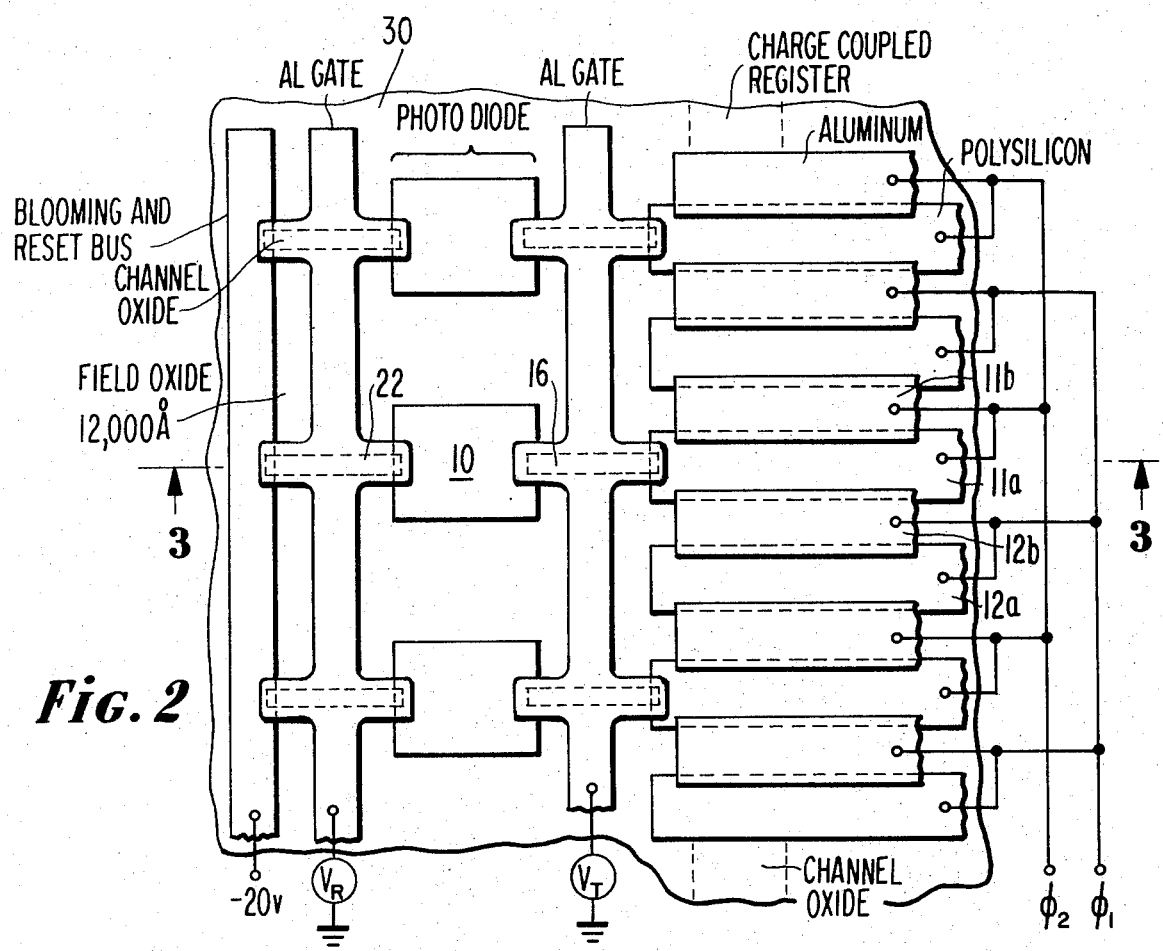
FIG. 2 is a more realistic showing, in plan view, of the embodiment of FIG. 1.
Figure 3:
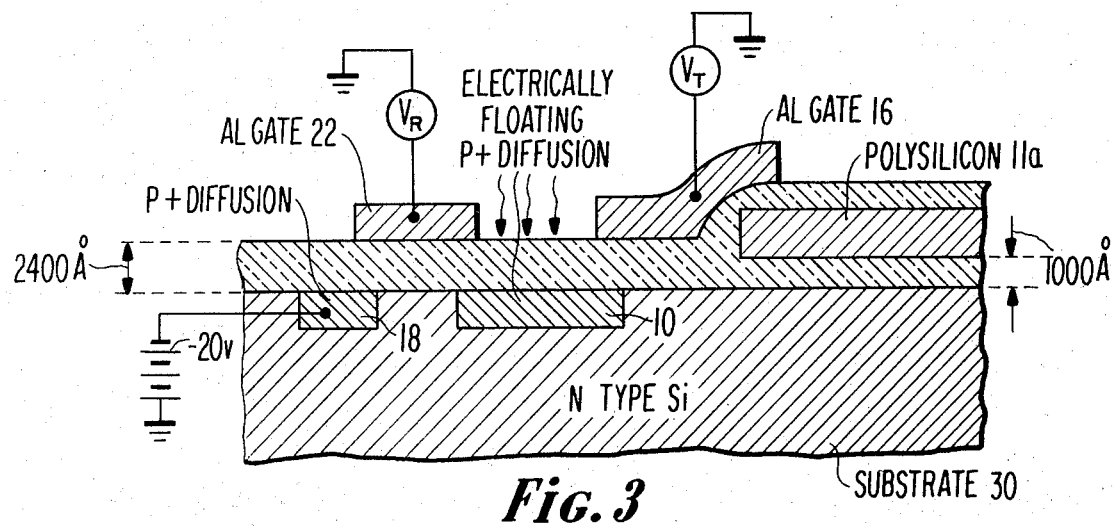
FIG. 3 is a section taken along line 3—3 of FIG. 2.
Figure 4:
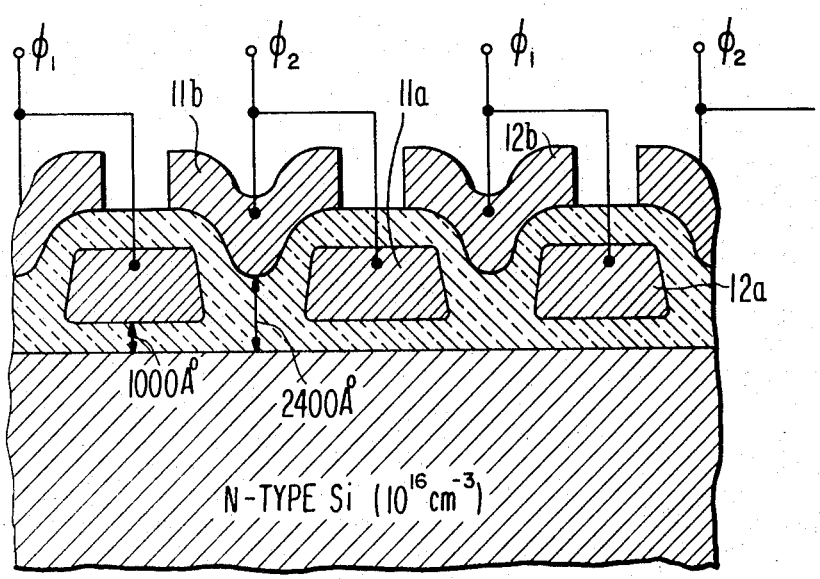
FIG. 4 is a section taken through the charge-coupled register of FIG. 1.

FIGS. 2–4 are more realistic showings of the elements of FIG. 1. Only one row of elements is discussed, that row of elements being identified by the same reference numerals as employed in FIG. 1.

The radiation sensing array comprises a substrate 30 formed of a material such as N-type silicon. The silicon may have an impurity concentration of $10^{16}$ $CM^{-3}$, as an example. The charge carriers in this case are holes, as well understood in the art. The photodiodes 10 comprise electrically floating P type diffusions at the surface of substrate 30. The drain bus or "sink" 18 is also a P type diffusion at the surface of the substrate. The element controlling the passage of charge signal from the sensor 10 to the sink 18 is an aluminum gate electrode 22 slightly overlapping the two diffusions 10 and 18 and spaced from the substrate by a relatively thin insulating layer such as silicon dioxide. In this particular embodiment, the "oxide" thickness in the region where coupling between the photodiode and the drain 18 is desired is relatively small and is shown as 2,400 Angstroms (A). The oxide thickness between channels is much greater and is shown as 12,000 A.

Each charge-coupled register stage comprises two pairs of electrodes; the first pair includes a polysilicon electrode 11a close to the substrate and an aluminum electrode 11b overlapping that polysilicon electrode and the next adjacent polysilicon electrode. The second pair of electrodes 12a, 12b of that location is similar in structure to the first pair of electrodes. The oxide in the charge-coupled register channel is relatively thin; 1,000 A beneath the polysilicon electrodes and 2,400 A beneath the aluminum electrodes, both by way of example. As is now well understood in this art, the asymmetrical potential wells formed by the electrode pairs permit two phase propagation of charge signal, as discussed, for example, in W. F. Kosonocky, J. E. Carnes, "Two Phase Charge Coupled Shift Registers," IEEE Int. Solid-State Circuits Conference, Feb. 17, 1972, page 132.

The coupling between the polysilicon electrode 11a of an electrode pair and the sensor 10 is by means of an aluminum gate electrode 16. Light reaches diffusion 10 either from the upper surface of the array, as shown in FIG. 3 or, if desired, the silicon substrate may be thinned and light projected onto the sensors from the bottom surface of the array.

Figure 6:
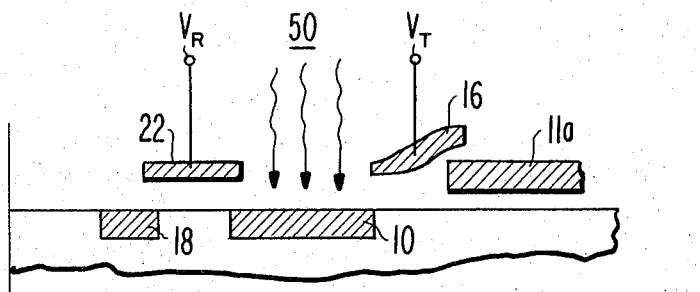
FIG. 6 is a drawing showing potential profiles and electrode structures to help explain the operation of the apparatus of FIGS. 1–4.
Figure 6:
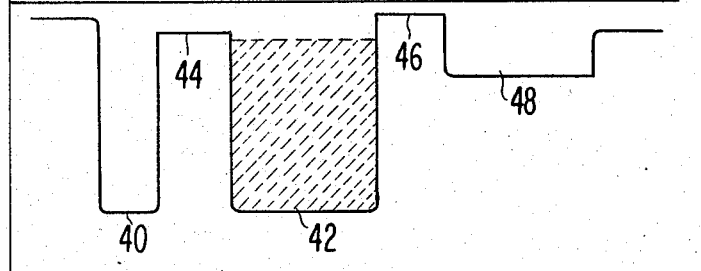
Figure 6:
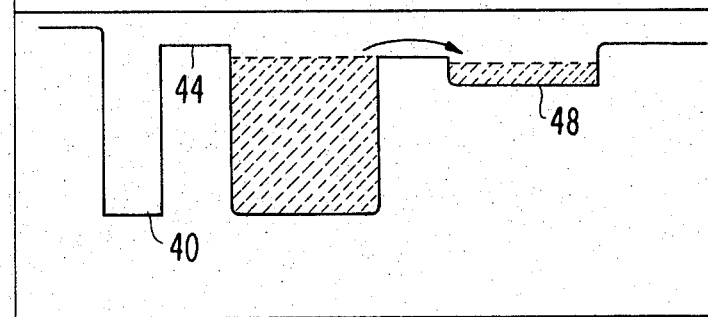
Figure 6:
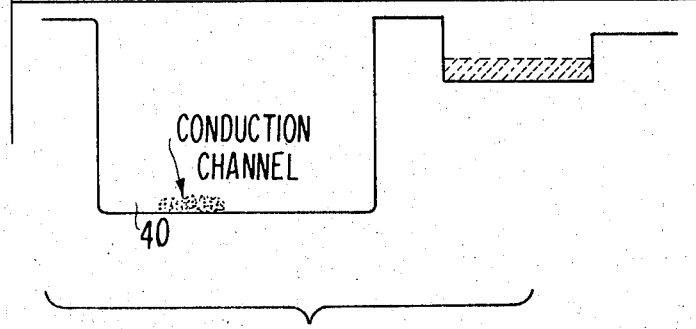

The operation of the arrangement just discussed is shown most clearly in FIG. 6. The electrode structure is shown at a and the potential profile at the substrate surface is shown at b. As the drain bus 18 is maintained at −20 volts, there is a deep potential well 40 at the substrate surface corresponding to the bus 18. The sensor diffusion 10 is assumed initially to have been reset and its potential well 42 is of approximately the same depth as well 40. The reset gate 22 is at −3 volts during the integration time, causing a potential hill 44 to exist between the wells 40 and 42. The polysilicon electrode 11a is at a −5 voltage level, resulting in the potential well 48. The transfer gate 16 is at −1 volt, resulting in the potential barrier 46 between the potential wells 42 and 48.

During the integration time, radiation, indicated by arrows 50 in FIG. 6a, reaches the diffusion 10 and excites the production of minority carriers (holes). These cause a surface charge signal to build up at the surface of the substrate and this surface charge signal is indicated schematically in FIG. 6b by the dashed crossed hatching within the potential well 42. In the case of infrared radiation where the scene contrast is only of the order of several per cent, the integration time may be relatively long, and the major part of the charge signal produced is background signal; however, a small part is intelligence of interest.

After a predetermined integration time, the voltage applied to the transfer gate 16 is changed from −1 volt to a value such as −4 volts. As a result, a small portion of the charge signal accumulated in the well 42 transfers to the well beneath the polysilicon electrode 11a. By precisely controlling the voltage applied to the transfer gate, the amount of charge remaining in the well 42 can be precisely controlled.

After the transfer of charge above, the transfer gate potential may be returned to its initial value of −1 volt and the gate 22 changed in potential from −3 volts to −25 volts. The −25 volts applied to the gate 22 causes a conduction channel of low impedance to form between the photodiode diffusion 10 and the drain bus 18 and all of the charge remaining at the diffusion 10 drains into the bus 18. In the process, the photodiode diffusion 10 is again reset to the −20 volt potential level of the drain bus 18.

Figure 5:
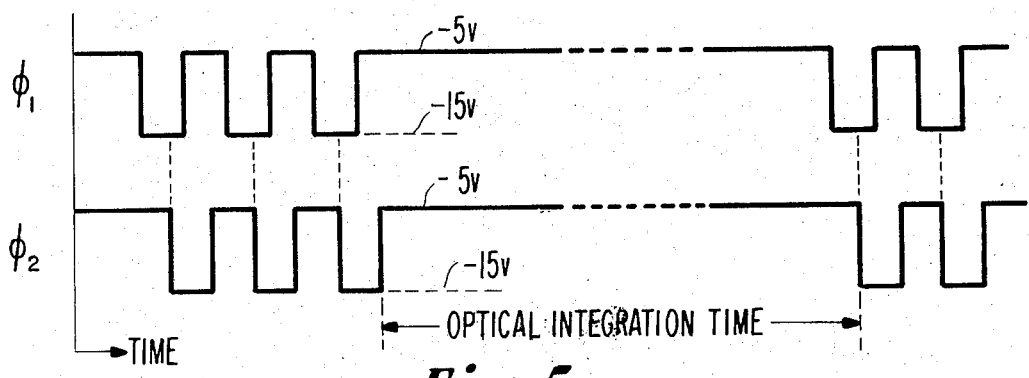
FIG. 5 is a drawing of two phase waveforms, which may be used to operate the charge-coupled register.

The shifting of charge out of the charge-coupled register by applying the two phase waves shown in FIG. 5 may begin as soon as the voltage applied to the transfer gate 18 is returned to −1 volt. The next integration frame can start as soon as the gate 22 is returned to the −3 volt level.

In the embodiment of the invention illustrated in the drawings, the sensor is illustrated as a silicon photodiode. It is to be understood that this is merely representative as other photosensors may be used instead. Moreover, while the photosensor illustrated is one of the type which produces a symmetric potential well at the substrate surface, if desired a different form of sensor may be employed which causes an asymmetric potential well to form. In this form of photosensor, an additional gate may be employed to provide a barrier between the charge created in the deeper portion of the well and that at the shallower portion of the well and only that part of the charge present in the shallower portion of the well passed to the charge coupled register. Operated in this way, a very small portion of the charge accumulated in the photosensor can be made to pass to the charge-coupled register.

It is also to be understood that materials other than the ones shown can be employed for the charge coupled structures. For example, insulation other than silicon dioxide may be used. Also indirim antimonide substrates can be employed, for example, and insulators such as aluminum oxide or silicon nitride.

While in the embodiment of the invention illustrated, the gate electrode 16 of the transfer devices is "pulsed" to permit charge transfer from the photodiodes to the charge-coupled register, the gate electrodes may instead be maintained at a fixed DC level. In this embodiment, the integration time and the scene intensity will determine the amount of charge transfer from the photodiodes to the charge-coupled register stages. An advantage of operating in this way is that no noise is introduced due to switching transients.

As mentioned above, photosensors other than those of the diffused type may be used in the present system. For example, the photosensor may be a MOS (metal oxide semiconductor) or MIS (metal insulator semiconductor) structure with the "metal" formed of a transparent conductor. One example of such a material which is transparent to infrared radiation is polysilicon. An important difference is the operation of this photosensor from the one described previously is that in the case of MIS photosensor all of the detected charge can be removed into the blooming bus every frame time, while the potential barrier formed between the MIS photosensor and the charge coupled register will determine the amount of signal change that will be transferred (skimmed off) into the charge-coupled register.

The value of this potential barrier will be determined by the voltage applied between the photosensor electrode and gate 16. The transfer of charge signal from the photosensor into the charge coupled register can be accomplished (a) either by lowering the potential barrier under gate 16 while the photosensor electrode is maintained at a fixed potential, or (b) by maintaining gate 16 at a fixed potential and retaining part of the detected charge signal by making the potential well of the MIS photosensor shallower.

What is claimed is:

1. The combination in a radiation sensing array of:
   a radiation sensor for accumulating charge signal in response to radiation received thereby;
   a drain maintained at a potential suitable for receiving said charge signal;
   a register stage;
   means coupling said sensor to said register stage for transferring to said register stage only that portion of the charge signal accumulated by said sensor of greater than a given charge signal level; and
   means coupling said sensor to said drain for forming a potential barrier between said sensor and said drain in response to one value of control signal and for forming a conduction channel between said sensor and said drain for transferring the remaining portion of the charge signal to said drain and resetting said sensor to a reference potential in the process, in response a second value of said control signal.

2. The combination as set forth in claim 1, wherein said means coupling said sensor to said register stage comprises means forming a potential barrier to the transfer of said charge signal in response to one value of a transfer signal, and forming a conduction path for transferring said portion of said charge signal of greater than said given value to said register stage in response to a second value of said transfer signal.

3. The combination as set forth in claim 2, wherein said register stage comprises a charge-coupled register stage.

4. The combination as set forth in claim 1, wherein said radiation sensor comprises a region of one conductivity type located in a substrate of different conductivity type.

5. The combination as set forth in claim 4, wherein said drain compirses a second region in said substrate of said one conductivity type, and wherein said means coupling said sensor to said drain comprises a gate electrode spaced and insulated from said substrate and from said two regions, and extending between said two regions.

6. A radiation sensing circuit comprising, in combination;
   a radiation sensor for accumulating charge signal in response to radiation received thereby;
   a drain maintained at a potential suitable for receiving said charge signal;
   a register stage;
   a conduction path between said radiation sensor and said register stage;
   means for controlled the conduction through said path to a relatively low level to permit only that portion of the charge signal accumulated by said sensor which exceeds a given relatively large fraction, more than at least half the storage capacity of said well, to pass through said conduction path to said register stage;
   a second conduction path, this one between said radiation sensor and said drain; and
   means for preventing conduction through said second conduction path during the transfer of charge from said radiation sensor to said register stage and for thereafter controlling the conduction through said second conduction path at a relatively high level to remove the charge remaining in said radiation sensor to said drain and for resetting the sensor to substantially the drain potential, in the process.

7. A radiation sensing circuit as set forth in claim 6 wherein each conduction path comprises the source-to-drain path of a field effect transistor and wherein the means for controlling the first-named such path comprises means for applying to the gate electrode of the field effect transistor containing that path a relatively low level of voltage in the forward direction for establishing conduction at a relatively high impedance level through said path, and said means for controlling the second path comprises means for applying to the gate electrode of the field effect transistor containing that second conduction path a voltage which can be switched between a first level at which said conduction path is cut off and a second relatively high level of voltage in the forward direction for establishing conduction at a relatively low impedance level through said second path.

8. A method for improving the contrast between two charge signals produced by two radiation sensors, respectively, comprising the steps of:
   individually removing from each sensor only that portion of the charge signal which that sensor is storing, which is greater than a predetermined reference level, said level being greater than at least one half of the total charge storage capacity of each sensor;
   employing said individually removed charge signals, as the signals representing the radiation received by the respective sensors; and
   discarding the remaining, major portion of the charge signal in each sensor.

* * * * *